(12) United States Patent
Smith

(10) Patent No.: US 9,452,623 B2
(45) Date of Patent: Sep. 27, 2016

(54) PRINT TABLE

(71) Applicant: Inca Digital Printers Limited, Cambridge (GB)

(72) Inventor: Philip Russell James Smith, Cambridge (GB)

(73) Assignee: Inca Digital Printers Limited (GB)

( * ) Notice: Subject to any disclaimer, the term of this patent is extended or adjusted under 35 U.S.C. 154(b) by 0 days.

(21) Appl. No.: 14/774,486

(22) PCT Filed: Feb. 17, 2014

(86) PCT No.: PCT/GB2014/050450
§ 371 (c)(1),
(2) Date: Sep. 10, 2015

(87) PCT Pub. No.: WO2014/140521
PCT Pub. Date: Sep. 18, 2014

(65) Prior Publication Data
US 2016/0039225 A1    Feb. 11, 2016

(30) Foreign Application Priority Data

Mar. 14, 2013 (GB) .................................. 1304628.9

(51) Int. Cl.
| | |
|---|---|
| *B41J 11/06* | (2006.01) |
| *B32B 3/12* | (2006.01) |
| *B41J 3/28* | (2006.01) |
| *B41J 11/00* | (2006.01) |
| *B32B 7/02* | (2006.01) |
| *B32B 7/12* | (2006.01) |
| *B32B 15/04* | (2006.01) |
| *B32B 15/20* | (2006.01) |
| *B31D 3/02* | (2006.01) |

(52) U.S. Cl.
CPC ............. *B41J 11/06* (2013.01); *B31D 3/0284* (2013.01); *B31D 3/0292* (2013.01); *B32B 3/12* (2013.01); *B32B 7/02* (2013.01); *B32B 7/12* (2013.01); *B32B 15/04* (2013.01); *B32B 15/20* (2013.01);

(Continued)

(58) Field of Classification Search
CPC . B41J 11/0065; B41J 11/007; B41J 11/0085; B41J 11/06; B41J 13/103
USPC ........................................................ 347/104
See application file for complete search history.

(56) References Cited

U.S. PATENT DOCUMENTS 2,609,068 A * 9/1952 Pajak ...................... E04C 2/365
101/382.1
2,700,632 A    1/1955 Ackerlind (Continued)

FOREIGN PATENT DOCUMENTS

| CN | 202448457 U | 9/2012 |
|---|---|---|
| DK | 102011012870 A1 | 9/2012 |

(Continued)

OTHER PUBLICATIONS

International Search Report from International Publication No. PCT/GB2014/050450 mailed May 20, 2014.

*Primary Examiner* — Manish S Shah
*Assistant Examiner* — Roger W Pisha, II
(74) *Attorney, Agent, or Firm* — Lerner, David, Littenberg, Krumholz & Mentlik, LLP

(57) ABSTRACT

A table for a flatbed printer comprises an upper plate (4) and a lower plate (6) separated by an intermediate layer (8). The intermediate layer is configured to provide a fluid flow path (34) that promotes a flow of fluid alternating between a position adjacent the upper plate and a position adjacent the lower plate, so as to promote heat transfer between the upper plate and the lower plate. The fluid flow path may be formed using a plurality of holes (26) in the intermediate layer. A method of manufacturing the printer table is also described.

16 Claims, 3 Drawing Sheets

(52) U.S. Cl.
CPC ............... *B41J 3/28* (2013.01); *B41J 11/0085* (2013.01); *B32B 2307/302* (2013.01)

(56) References Cited

U.S. PATENT DOCUMENTS

| | | |
|---|---|---|
| 2,734,843 A | 2/1956 | Ackerlind |
| 3,501,367 A | 3/1970 | Parker |
| 5,505,124 A | 4/1996 | Esposito |
| 2012/0236101 A1* | 9/2012 | Kato .................. B41J 11/06 347/104 |

FOREIGN PATENT DOCUMENTS

| | | |
|---|---|---|
| GB | 625036 A | 6/1949 |
| GB | 1248049 A | 9/1971 |
| JP | S5985741 A | 5/1984 |

* cited by examiner

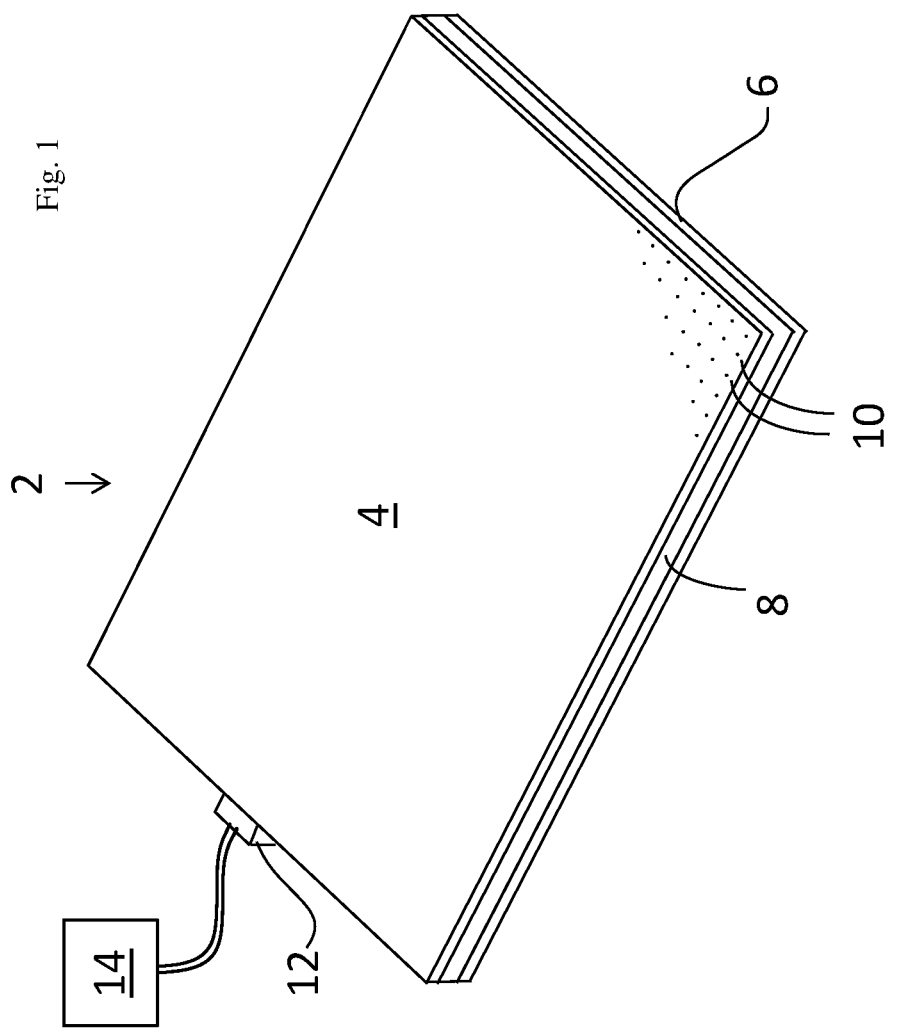

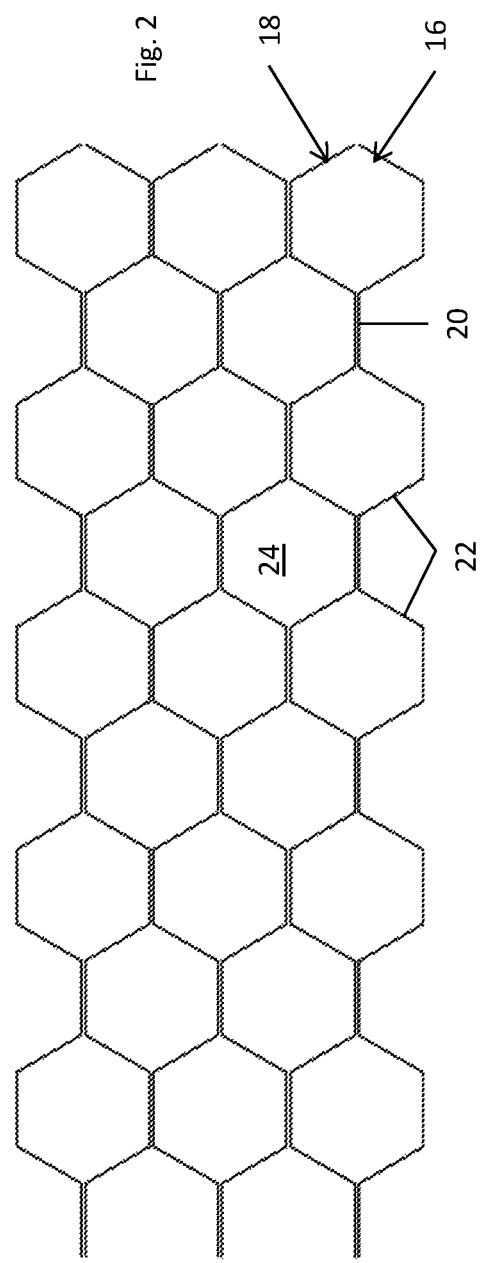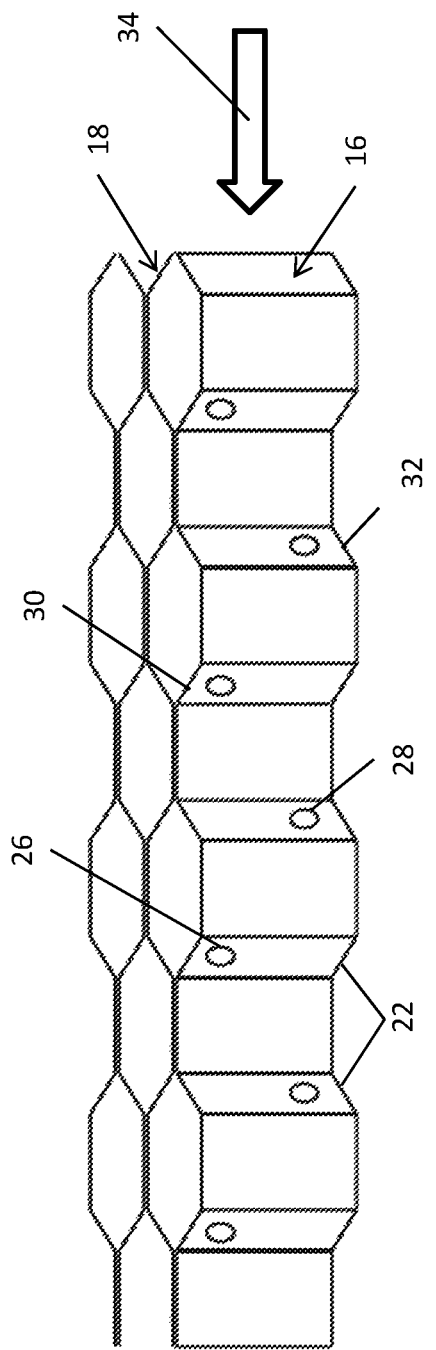

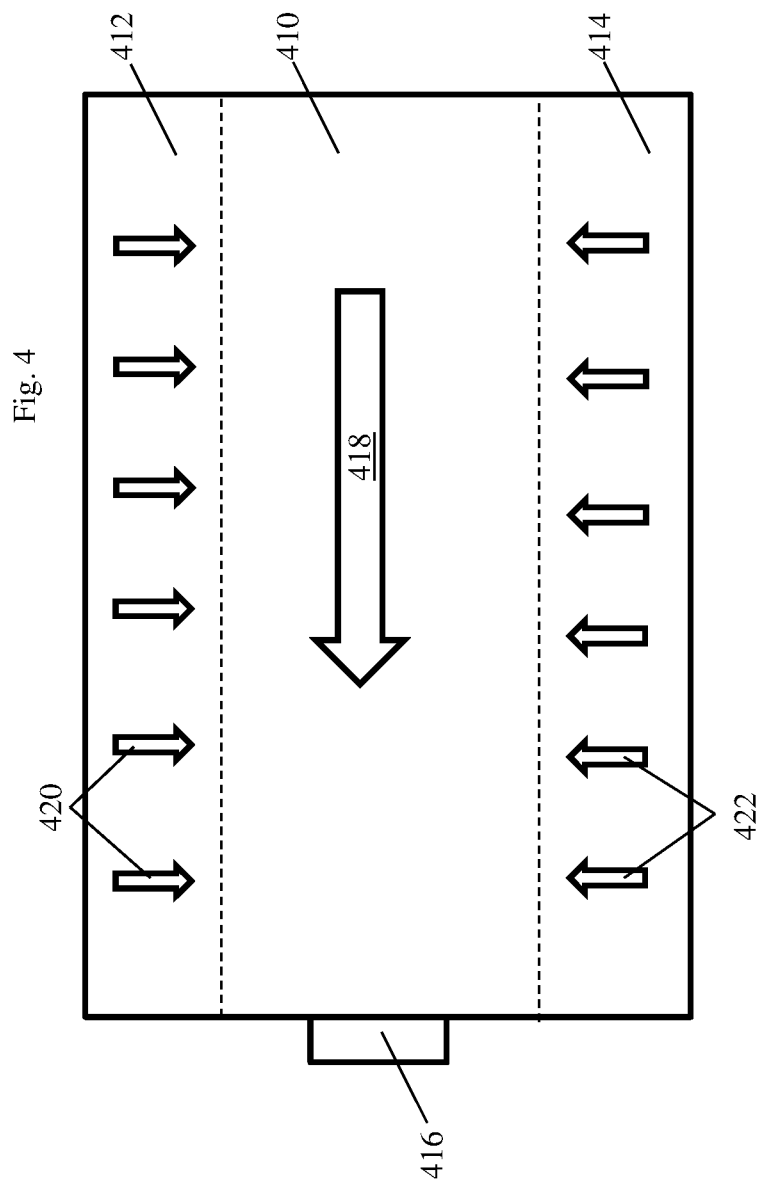

PRINT TABLE

CROSS-REFERENCE TO RELATED APPLICATION

The present application is a national phase entry under 35 U.S.C. §371 of International Application No. PCT/GB2014/050450, filed Feb. 17, 2014, which claims priority from GB Patent Application No. 1304628.9 filed Mar. 14, 2013, the disclosures of which are hereby incorporated by reference herein in their entirety.

This invention relates to a print table for a flatbed printer, and in particular for an inkjet printer. The invention further relates to a method of manufacturing the print table.

Inkjet printers usually comprise a print carriage carrying print heads comprising a plurality of ink nozzles, mounted over a print table for supporting a substrate. The print quality of an ink jet printer is strongly influenced by the size of the print gap, or the gap between the substrate and the print heads. The gap needs to be small, and to be kept uniform for consistent print quality over the print area. A typical print gap is about 1.5 mm and a variation in the print gap of around 0.1 mm can cause visible print artifacts in the printed image.

Flatbed printers commonly use UV curing ink, and incorporate UV lamps which apply radiant heat to the substrate and thus to the upper surface of the print table. This tends to induce a distortion in the print table due to the temperature difference between the upper and lower surfaces, thus producing variations in the print gap. This problem becomes greater as printers become faster, requiring higher curing power, and as print quality standards improve, requiring smaller errors in droplet positioning. Typically 2 to 5 kW of heat needs to be transferred away from the upper surface across the thickness of the table.

One method of transferring heat away from the upper surface of the print table may be to provide a substantially solid table manufactured from a heat-conducting material. However, a solid table is likely to be prohibitively expensive and heavy, particularly since many print tables are designed to move during printing.

Therefore, in order to reduce weight, print tables, particularly large print tables, may comprise an upper plate or skin and a lower plate approximately 2-3 mm thick, each of which is typically made of metal, with an intermediate layer such as an aluminium honeycomb lattice structure therebetween. This can cause greater temperature differences across the thickness of the table, since the thin aluminium lattice which is glued to the plates provides poor conduction across the table. For example the temperature differential between the upper plate of the table and the lower plate is typically about 2-3 degrees.

The temperature difference between the upper and lower plates of the table can cause significant distortion in the table, since heat energy in the upper metallic plate will cause it to expand, while the relatively cooler lower plate does not expand to the same extent.

Previous systems and methods have focused on cooling the upper plate of the table to reduce the temperature differential between the upper and lower plates.

In one aspect, there is provided a table for a flatbed printer comprising: an upper plate and a lower plate separated by an intermediate layer, the intermediate layer being configured to provide a fluid flow therein that promotes a flow of fluid alternating between a position adjacent the upper plate and a position adjacent the lower plate, so as to promote heat transfer between the upper plate and the lower plate.

In preferred embodiments, the fluid contacts alternately the upper plate and the lower plate. Thus the flow of fluid in the intermediate layer travels along a serpentine or oscillating path bringing it into contact with the upper plate and the lower plate alternately, which tends to equalize the temperatures of the upper and lower plates. It will be appreciated that the fluid flow path may alternate slowly between the upper and lower plates so that fluid flowing between the plates may contact each plate only one or two times in its path out of the table, however, a more quickly oscillating fluid flow path is preferable for most applications to increase heat transfer. An alternating fluid flow may be provided in one embodiment by causing a portion of fluid to flow from a position adjacent the upper plate to a position adjacent the lower plate and by causing a portion of fluid, preferably the same portion of fluid, to flow between a position adjacent the lower plate and a position adjacent the upper plate. Thus, the present system and method aims to reduce temperature differences between the upper and lower plates by enabling heat transfer in both directions between the plates in order to reduce heat-induced distortion of the table. In turn, reduced distortion in the table reduces the variation in the print gap over the surface of the table.

Preferably, the fluid flow path promotes a flow of fluid substantially in the plane of the table. Hence, while fluid may flow up and down between the upper and lower plates of the table, the larger component of the fluid flow is generally along the table, between the two plates. Hence fluid is drawn across the inner surfaces of the table.

Alternatively, or in addition the fluid flow path may promote a turbulent flow of fluid between the position adjacent the upper plate and the position adjacent the lower plate. Such a turbulent flow, for example to create eddies adjacent the upper and lower plates, may increase heat transfer between the upper and lower plates. In some embodiments, fluid flow paths may be set up to promote both turbulent and alternating fluid flow, either sequentially or in the same part of the flow path. In one embodiment, turbulent flow may first be created in the fluid flow path and the table may be arranged so that this is changed to an alternating flow path as the fluid passes through the table.

In a highly preferred embodiment, the fluid flow path is formed by a plurality of apertures in the intermediate layer. Fluid can be arranged to flow through the apertures to transfer heat from the upper to the lower plate.

Preferably, the upper plate comprises a plurality of negative pressure apertures, and the fluid flow is air flow from at least one of the apertures to an air extraction location. These negative pressure apertures, or matrix of vacuum holes, are primarily designed for holding the substrate onto the table with a negative pressure. The holes are connected to a vacuum source at an air extraction location, via a vacuum channel. The air extraction location is preferably provided at the edge of the table.

Thus, conveniently, air being drawn through the upper plate to the vacuum source is used to improve heat conduction between the plates, with the air flowing up and down between the plates transferring heat energy as it is drawn out through the table. However, alternatively the fluid flow may be an airflow produced by a recirculating fan.

The intermediate layer may comprise spacer members formed as thin sheet material walls extending between the plates, for example arranged in a lattice structure such as a honeycomb structure. The material of the spacer members may be a relatively strong lightweight, but deformable, material such as aluminium. The fluid flow path may be provided by holes in the sheet material. The holes may be provided adjacent the top or bottom of the walls as required to induce the alternating flow between the plates. The holes are preferably close to the top or bottom of the wall respectively to increase heat transfer from the plates to the flow. For example, the holes may be arranged such that they are alternately adjacent the upper and lower plates, in a direction substantially parallel to the flow direction. However, in alternative embodiments, pairs or groups of holes may be arranged adjacent the upper and lower plates alternatively so that, for example, two or three holes may be positioned adjacent the upper plate before two or three holes are positioned adjacent the lower plate. Such an arrangement may increase the speed of fluid flow through the intermediate layer to increase the vacuum pressure on the substrate.

In some embodiments, the holes may be indentations in the top and bottom surfaces of the intermediate layer, causing the fluid to flow next to the inner surfaces of the upper and lower plates.

In preferred embodiments, the intermediate layer comprises a lattice structure comprising a plurality of cells. Preferably, a hole is provided in at least one wall of each cell.

A honeycomb structure for the intermediate layer is conveniently formed by applying stripes of glue between layers of aluminium sheet material. The strips of glue are staggered between layers such that when the strips are pulled apart, a generally hexagonal lattice is formed. Holes may be drilled or otherwise formed in the layered sheets before pulling apart, in alternating high and low positions.

According to a further aspect, there is provided a method of manufacturing an intermediate layer for use in a print table having upper and lower plates with the intermediate layer arranged therebetween, the method comprising: arranging a plurality of elongate layers of planar, deformable material in a stack, wherein portions of each layer are attached to an adjacent layer and portions of each layer are unattached; forming apertures through the stack of layers at intervals along the length of the elongate layers between the attached portions of the layers, wherein a first plurality of apertures are formed adjacent to one edge of the elongate layers and a second plurality of apertures are formed adjacent to the other edge of the elongate layers; and pulling apart the unattached portions of the layers of material to form from the stack a lattice structure comprising a plurality of cells.

The method may provide an efficient way to manufacture an intermediate layer for a print table, the intermediate layer having a fluid flow path therethrough that promotes transfer of heat from the upper to the lower plates of the print table.

In a preferred embodiment, the first plurality of apertures is interleaved with the second plurality of apertures. Along each elongate layer, apertures of the first plurality may alternate with apertures of the second plurality, or apertures may be grouped to some extent with 2 or 3 apertures of the first plurality being followed by 2 or 3 apertures of the second plurality. However, the interleaving of the apertures enables apertures to be formed alternately next to the upper and lower plates, encouraging a flow of air and transfer of heat energy between the plates.

In a preferred embodiment, the positions of the apertures are registered to the attachment positions of the layers. Hence, apertures may be placed between portions of the layers that are attached to other layers. This causes the formation of apertures in the diagonal faces of the cells when the layers are expanded into a lattice structure.

Preferably, an aperture is formed in at least one wall of each cell of the lattice structure, preferably in two walls of each cell to provide a fluid flow path through the cell.

Preferably, successive apertures alternate between the first plurality and the second plurality of apertures along the length of the elongate layers so that apertures are formed alternately adjacent to one edge and then the other edge of the elongate layers.

The method preferably further includes attaching an upper plate to a face of the lattice structure, preferably forming a plurality of apertures in the upper plate arranged over at least a portion of its surface and further preferably attaching a lower plate to the opposing face of the lattice structure.

Adjacent layers in the stack may be attached at attachment positions spaced periodically along the length of the elongate layers. Preferably, the attachment positions between a first pair of layers are offset relative to the attachment positions between the following pair layers. The positioning of the holes may be indexed relative to the attachment positions so that one hole is formed between each attachment position. This provides two holes in each cell of the lattice when the stack is pulled apart to form a lattice structure.

The present method creates a lattice of hexagonal cells, with apertures formed in two of the diagonal sides of the lattice. Forming apertures in the diagonal faces of the lattice means that fluid can be drawn through the lattice in any direction. In particular, the apertures formed by the method described will clearly align in the direction in which they were formed. However, fluid can be drawn through the lattice structure in a direction perpendicular to the direction in which the apertures were formed and this will cause the fluid flow path to alternate between the upper and lower surfaces of the lattice.

In a particular embodiment, adjacent layers in the stack are attached using strips of adhesive positioned perpendicular to the length of the elongate layers. Preferably, the strips of adhesive are arranged in a regular pattern of stripes and wherein the pattern of stripes between a first pair of layers is offset relative to the pattern of stripes between the following pair of layers.

Preferably, the method further comprises attaching a negative pressure source at one edge of the lattice structure to draw fluid through the apertures in the lattice structure. Preferably, fluid is drawn through the lattice structure in a direction substantially perpendicular to the direction in which the apertures were formed. That is, fluid is drawn through the lattice structure in a direction parallel to the elongate layers of material.

In order that the invention may be more readily understood, reference will now be made, by way of example, to the accompanying drawings, in which:

FIG. 1 is a perspective view of a table for a flat bed printer according to one embodiment of the invention;

FIG. 2 is a plan view of the intermediate layer of the table of FIG. 1;

FIG. 3 is a perspective view of the intermediate layer of FIG. 2;

FIG. 4 is a schematic illustration of a table according to a further embodiment.

Referring to FIG. 1, the table 2 comprises an upper plate or skin 4 and a lower plate or skin 6, supported by a honeycomb intermediate layer 8, which has a lattice structure described in more detail below. The honeycomb intermediate layer 8 is glued to the upper 4 and lower 6 plates across the face of the lattice. The upper plate 4 includes a plurality of negative pressure apertures 10 (only some of which are shown) which are used to hold a substrate to be printed onto the table. A vacuum extraction port 12 is provided at one edge of the table, connected to a negative pressure source, shown schematically at 14. It can be seen that air is thus drawn in through the apertures, and travels to the extraction port 12 within the intermediate layer 8.

Edge pieces (not shown) may be provided around the edges of the table to ensure that air is predominately drawn into the intermediate layer through the apertures 10 formed in the upper plate 4 and to enable the negative pressure source 14 to maintain a negative pressure through the table. However, it will be appreciated that the edge pieces do not have to be air-tight.

Referring now to FIGS. 2 and 3, the intermediate layer is a honeycomb lattice for example formed of aluminium sheets strips 16, 18. Each strip (e.g. 16) is glued to an adjacent strip (e.g. 18) along common wall sections 20. Angled wall sections 22 extend between each common wall section 20 of each strip 16, 18 to form generally hexagonal cells 24. First and second sets of holes 26, 28 are provided in the angled wall sections 22. The first set of holes 26 are located adjacent the upper edge 30 of each alternate angled wall section 22 of each strip, and the second set of holes 28 are located adjacent the lower edge 32 of the other alternate wall sections 22.

To manufacture the intermediate layer 8, flat strips are layered on top of each other, and glue is applied between each layer in staggered stripes to form the common wall sections 20. It will be understood that the angled wall sections will be formed by unglued areas between each glued section. It is then possible to form the first and second set of holes 26 by simply drilling through the layered structure in between the glued stripes alternately adjacent the upper and lower edges 30, 32 respectively. The structure may then be pulled apart to form the finished lattice.

In an alternative method of manufacture, apertures may be formed in each strip of aluminium before the strips are layered and fixed on top of each other. For example, the lattice may be formed by stacking a plurality of pre-perforated strips of aluminium on top of each other with adhesive arranged in a regular staggered pattern as described above and the apertures offset between adjacent layers.

In use, the vacuum source 14 draws air from the apertures 10 in the upper plate 4 through the intermediate layer 8 to the extraction port 12. The intermediate layer is oriented with each strip 16, 18 of the lattice extending along the length of the table 2 so as to be substantially perpendicular to the air flow direction, indicated by the arrow 34 in FIG. 3. It can be seen that the air flow will be guided alternately through a first hole 26 and then a second hole 28 along a serpentine or oscillating path. This causes the air to come into proximity alternately with the upper plate 4 and then the lower plate 6, thus facilitating conduction of heat between the plates 4, 6 to equalize their temperatures.

It will be appreciated that other structures of the intermediate layer are possible. The arrangement of holes may depend upon the location of the vacuum extraction port and the rate at which air is to be drawn through the upper plate, as set out above. Where the intermediate layer 8 has a lattice structure, at least one hole should preferably be provided in each cell to facilitate temperature equalization between the upper and lower plates.

In some embodiments, holes may be arranged in the lattice so that the direction of air flow through the lattice is generally towards the extraction port. That is, holes may not be arranged in a regular pattern in the same faces of the honeycomb structure of the lattice, but may be arranged in different faces of the lattice to allow air flow paths within the lattice to converge generally on the extraction port.

In some embodiments, as illustrated schematically in FIG. 4, the lattice structure may be constructed in separate sections to enable, for example, a central section 410 of the lattice to be arranged so that apertures enable air flow 418 along the length of the table towards the extraction port 416. Side pieces 412, 414 of the lattice may be manufactured separately and rotated through 90 degrees so that they can be arranged within the table to enable air flow sideways 420, 422 from the edges of the table toward the central piece of the lattice.

Alternatively the sides of the table can be used as manifolds to collect air, with air allowed to enter the bottom face of the table through restrictions distributed along the centre line of the table, so that airflow is mainly across the table, and the centre of the table gets the most cooling. This also helps the heat management to be independent of the porosity of the material being printed on.

In some embodiments, a more complex arrangement of holes may be provided within the lattice such that the air flow direction at each point in the lattice is arranged more accurately towards the extraction port. The direction of each air flow path may therefore vary as the air flow path passes through the lattice towards the extraction port. However, the oscillating or serpentine character of the air flow path, forcing the air to move between the upper and lower plates of the table, is retained.

For a more complex arrangement design of air flow paths such as this, a model of the air flow paths and the arrangement of holes necessary to enable the desired air flow paths may first be designed, for example by computer. The final lattice design of the model can then be reversed engineered by the computer to determine the arrangement of holes in each layer of the lattice that is necessary to produce the desired air flow paths. In manufacture, each layer of the aluminium lattice can then be pre-drilled so that apertures are formed in the required positions. The layers of the aluminium lattice can then be attached in a predefined order and in predefined positions to produce the lattice structure with the air flow paths as designed.

It will also be appreciated that the holes may not necessarily be complete apertures cut into the body of the lattice structure. They may instead be, for example, indentations or semi-circles cut into the edge of the lattice. This may cause air to flow adjacent to the upper and lower plates as it passes through the lattice.

The invention claimed is:
1. A flatbed printer table, comprising
    an upper plate and a lower plate separated by an intermediate layer, an upper surface of the upper plate defining a plane,
    the intermediate layer having a plurality of apertures therein which alternate between a position adjacent the upper plate and a positon adjacent the lower plate to promote a fluid flow path alternating between the position adjacent the upper plate and the position adjacent the lower plate, so as to promote heat transfer between the upper plate and the lower plate, wherein the upper plate comprises a plurality of negative pressure apertures and the fluid flow path comprises a fluid flow path from at least one of the negative pressure apertures,
    the flatbed printer table further comprising a fluid extraction location adjacent at least one edge of the table, wherein the fluid flow path between the upper and lower plates extends substantially in the plane of the table towards the fluid extraction location.

2. A flatbed printer table, according to claim 1 wherein the fluid flow path promotes a turbulent flow of fluid between the position adjacent the upper plate and the position adjacent the lower plate.

3. A flatbed printer table, according to claim 1, comprising a recirculating fan arranged to induce the fluid flow in the intermediate layer.

4. A flatbed printer table, according to claim 1, in which the intermediate layer comprises a plurality of spacer members formed from sheet material walls extending between the plates.

5. A flatbed printer table, according to claim 4, in which the apertures in the intermediate layer are holes in the spacer members.

6. A flatbed printer table, according to claim 1, in which the intermediate layer comprises a lattice structure comprising a plurality of cells.

7. A flatbed printer table, according to claim 6, in which at least one of the apertures is provided in at least one wall of each cell.

8. A flatbed printer table, according to claim 5 in which the holes are arranged in walls of the spacer members such that they are alternately adjacent the upper and lower plates, in a direction substantially parallel to the flow direction.

9. A flatbed printer table, according to claim 8, in which the holes are provided closely adjacent the top or bottom of the walls respectively to facilitate heat transfer from the plates to the fluid.

10. A method of manufacturing an intermediate layer for use in a print table having upper and lower plates with the intermediate layer arranged therebetween, the method comprising:

arranging a plurality of elongate layers of planar, deformable material in a stack, wherein portions of each layer are attached to an adjacent layer and portions of each layer are unattached;

forming apertures through the stack of layers at intervals along the length of the elongate layers between the attached portions of the layers, wherein a first plurality of apertures are formed adjacent to one edge of the elongate layers and a second plurality of apertures are formed adjacent to the other edge of the elongate layers; and pulling apart the unattached portions of the layers of material to form from the stack a lattice structure comprising a plurality of cells.

11. A method according to claim 10 wherein an aperture is formed in at least one wall of each cell of the lattice structure.

12. A method according to claim 10 wherein the first plurality of apertures is interleaved with the second plurality of apertures.

13. A method according to claim 10 wherein the positions of the apertures are registered to the attachment positions of the layers.

14. A method according to claim 10 wherein adjacent layers in the stack are attached at attachment positions spaced periodically along the length of the elongate layers.

15. A method according to claim 14 wherein the attachment positions between a first pair of layers are offset relative to the attachment positions between the following pair of layers.

16. A method according to claim 10 further comprising attaching a negative pressure source at one edge of the lattice structure to draw fluid through the apertures in the lattice structure.

* * * * *